United States Patent
Christensen et al.

(10) Patent No.: US 6,347,320 B1
(45) Date of Patent: Feb. 12, 2002

(54) SEARCH PARAMETERS

(75) Inventors: Carol Sue Christensen; Janice Marie Girouard; Nizamudeen Ishmael, Jr.; Richard Dennis Talbot, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/070,080

(22) Filed: Apr. 30, 1998

(51) Int. Cl.[7] .............................................. G06F 17/00
(52) U.S. Cl. ................... 707/102; 707/1; 707/2; 707/3; 707/4; 707/5; 707/6; 707/7; 707/103; 707/501
(58) Field of Search ............... 707/1–2, 3, 4, 707/5, 6–7, 103, 102; 704/9

(56) References Cited

U.S. PATENT DOCUMENTS

| | | | | |
|---|---|---|---|---|
| 5,233,513 A | * | 8/1993 | Doyle ............................. | 707/7 |
| 5,504,890 A | * | 4/1996 | Sanford ........................... | 707/3 |
| 5,796,952 A | * | 8/1998 | Davis et al. ................... | 709/224 |
| 5,809,506 A | * | 9/1998 | Copeland ...................... | 707/103 |
| 5,958,016 A | * | 9/1999 | Chang .......................... | 709/229 |
| 5,999,914 A | * | 12/1999 | Blinn et al. .................... | 705/26 |
| 6,012,055 A | * | 1/2000 | Campbell et al. .............. | 707/5 |
| 6,014,677 A | * | 1/2000 | Hayashi et al. ............. | 707/501 |
| 6,112,212 A | * | 8/2000 | Heitler ........................ | 707/501 |
| 6,138,155 A | * | 10/2000 | Davis et al. ................. | 709/224 |

* cited by examiner

*Primary Examiner*—Thomas Black
*Assistant Examiner*—Diane D. Mizrahi
(74) *Attorney, Agent, or Firm*—Volel Emile; Bracewell & Patterson, L.L.P.

(57) ABSTRACT

A method of searching for files located in a computer system, wherein each file has at least one of a plurality of fields, by creating a search query, selecting a subset of the fields for searching wherein the subset is selected independent of the search query, and processing the files by examining the content of only those fields included in the subset for matching against the query. The fields can be selected by using a default setting. Certain fields are ignored during the processing step. An illustrative embodiment is adapted for use with hypertext markup language (HTML) files that are transmitted along the Internet's World Wide Web. The user interface may include a pop-up window that displays a list of the tags which may be embedded in the files, and allows a user to individually select one or more tags so displayed for searching.

13 Claims, 5 Drawing Sheets

SEARCH PARAMETERS

BACKGROUND OF THE INVENTION

1. Field of the Invention

The present invention generally relates to computer systems, and more particularly to a method and system for searching computer files distributed across a network, such as hypertext markup language (HTML) pages on the World Wide Web of the Internet.

2. Description of Related Art

A generalized client-server computing network 2 is shown in FIG. 1. Network 2 has several nodes or servers 4, 6, 8 and 10 which are interconnected, either directly to each other or indirectly through one of the other servers. Each server is essentially a stand-alone computer system (having one or more processors, memory devices, and communications devices), but has been adapted (programmed) for one primary purpose, that of providing information to individual users at another set of nodes, or workstation clients 12. A client is a member of a class or group of computers or computer systems that uses the services of another class or group to which it is not related. Clients 12 can also be stand-alone computer systems (like personal computers, or PCs), or "dumber" systems adapted for limited use with network 2 (like network computers, or NCs). A single, physical computer can act as both a server and a client, although this implementation occurs infrequently.

The information provided by a server can be in the form of programs which run locally on a given client 12, or in the form of data such as files that are used by other programs. Users can also communicate with each other in real-time as well as by delayed file delivery, i.e., users connected to the same server can all communicate with each other without the need for the network 2, and users at different servers, such as servers 4 and 6, can communicate with each other via network 2. The network can be local in nature, or can be further connected to other systems (not shown) as indicated with servers 8 and 10.

The construction of network 2 is also generally applicable to the Internet. In the context of a computer network such as the Internet, a client is a process (i.e., a program or task) that requests a service which is provided by another program. The client process uses the requested service without having to "know" any working details about the other program or the service itself. Based upon requests by the user, a server presents filtered electronic information to the user as server responses to the client process.

Conventional protocols and services have been established for the Internet which allow the transfer of various types of information, including electronic mail, simple file transfers via FTP (file transfer protocol), remote computing via Telnet, "gopher" searching, Usenet newsgroups, and hypertext file delivery and multimedia streaming via the World Wide Web (WWW). A given server can be dedicated to performing one of these operations, or running multiple services. Internet services are typically accessed by specifying a unique address, or universal resource locator (URL). The URL has two basic components, the protocol to be used, and the object pathname. For example, the URL "http://www.uspto.gov" (home page for the United States Patent & Trademark Office) specifies a hypertext transfer protocol ("http") and a pathname of the server ("www.uspto.gov"). The server name is associated with a unique numeric value (a TCP/IP address, or "domain").

The present invention relates to searching of computer files that are distributed on a network like the Internet, but is particularly applicable to the WWW, which provides files that are conveniently linked for user access. For example, as illustrated in FIG. 2, a group 14 of files or pages 16a–16h are interrelated by providing hypertext links in each of the files (group 14 may thus be considered a typical "web site"). A hypertext link is an image that is viewable on the workstation's display 18, which can be selected by the user (e.g., using a pointing device or "mouse") and which then automatically instructs client workstation 12 to request another page associated with that particular hypertext link (i.e., issue another URL). A hypertext link may appear as a picture, or as a word or sentence, possibly underlined or otherwise accentuated to indicate that it is a link and not just normal, informative text.

A WWW page may have text, graphic (still) images, and even multimedia objects such as sound recordings or moving video clips. A hypertext page, if more than just text, is usually constructed by loading several separate files, e.g., the hypertext file "main.html" might include a reference to a graphic image file "picture.gif" or to a sound file "beep.wav". When a client workstation 12 sends a request to a server for a page, such as page 16a, the server first transmits (at least partially) the main hypertext file associated with the page, and then loads, either sequentially or simultaneously, the other files associated with the page. A given file may be transmitted as several separate pieces via TCP/IP protocol. The constructed page is then displayed on the workstation monitor 18 as shown in FIG. 2. A page may be "larger" than the physical size of the monitor screen (i.e., larger than the software-programmed "window" provided for viewing the page), and techniques such as scroll bars are used by the viewing software (the web browser) to view different portions of the page.

The increasing number of pages available on the Web, and their sometimes ephemeral nature, can make navigation of the WWW more difficult, requiring a user to follow many links before the desired information is finally found. For these and other reasons, it is often difficult to find a particular web page. Some Internet services such as Yahoo have organized links under topics of information, but many web pages are found using various types of search engines. Some search engines are local, that is, software set up and running on a client workstation, while other search engines are remote, running on a server. For the Internet, many search engines utilize wide area information services (WAIS) servers, which provide databases (similar to concordances) having information regarding the contents of web pages. Some network searching utilities are limited to queries relying on boolean operators (AND, OR, NOT), while others are more sophisticated and use intelligent programming to present a more natural interface to the user, and to narrow down or prioritize the search results.

One problem that frequently occurs when searching for files on large networks such as the Internet, is that far too many files (i.e., URLs) are found when searching for textual content within a page. This problem is exacerbated by the nature of web pages, that is, their use of field-based languages such as the hypertext markup language (HTML). This language provides a protocol for transmitting formatted information and control codes used to construct the "complete" page that is ultimately displayed by the browser. Different fields within the main HTML file are defined to store the formatted information and control code parameters, using tags. Tags not only mark elements, such as text and graphics, but can also be used to construct graphical user interfaces within the web page (such as buttons that are "depressed" by selecting them using the graphical pointer).

In HTML, a tag is a pair of angle brackets (<>) that contain one or more letters and numbers between the angle brackets. One pair of angle brackets is often placed before an element, and another pair placed after, to indicate where the element begins and ends. For example, the language "<B>TODAY ONLY<B>" uses the "B" tag to provide a boldface formatting code for the words "TODAY ONLY."

HTML fields and tags complicate searching strategies because they introduce additional words into the document which may not actually be relevant to the substantive content of the document. A prime example is embedded links in a document. If a user wants to locate pages which pertain to a particular topic, a search engine may indicate that many pages relate to the topic when, in actuality, they have little relation to the topic but they happen to include a link to a page dealing with the topic. In this situation, the user is less likely to be interested in viewing the dozens of pages which contain such links, and is more likely to want to see the pages that actually constitute the links. These latter pages may, however, be lost in the search engine's output among hundreds, or even thousands of search "hits." So-called intelligent search engines might even place a higher confidence level on less relevant pages, leaving the most relevant pages at the end of the search results, and so taking much longer before the user notices their existence.

Also, the information desired during a search is often only in one portion of a page. For example, a user may remember that a specific string of text can be found within a specific point within an HTML file (say, the title), but there is no method of limiting a search to a particular field. Another related, and sometimes aggravating, phenomenon is the inclusion of a particular page in search results due to text which does not even appear in the browser's display, but rather is hidden using tags. Search engines will identify such pages even though the main body of the page completely omits any reference to the keywords of the search. This limitation in the search engine allows unscrupulous commercial interests to peddle their web pages to anyone using search engines, by including long, hidden lists of keywords in the main HTML file, wherein the keywords may have absolutely nothing to do with the page, but are included only to provide matches for search engines.

In light of the foregoing, it would be desirable to devise a method of limiting the results of network file searches to more relevant files. It would be further advantageous if a user could, for example, retrieve only HTML file that contain the text within a given portion (field) of the file.

SUMMARY OF THE INVENTION

It is therefore one object of the present invention to provide an improved method of searching for files stored in a computer system.

It is another object of the present invention to provide such a method that is adapted to identify files that are distributed within a computer network, particularly a large network such as the Internet.

It is yet another object of the present invention to provide such a method which searches the contents of files that use tag structures to provide formatted information or control codes.

The foregoing objects are achieved in a method of searching for files located in a computer system, generally comprising the steps of constructing a plurality of files on the computer system wherein each file has at least one of a plurality of fields, creating a search query, selecting a subset of the fields for searching wherein the subset is selected independent of the search query, and processing the files by examining the content of only those fields included in the subset for matching against the query. The fields can be selected by using a default setting. Certain fields are restricted from being selected, i.e., they are always ignored during the processing step. An illustrative embodiment is adapted for use with hypertext markup language (HTML) files that are transmitted along the Internet's World Wide Web, and have a plurality of tags embedded in the files to define the fields. The user interface may include a pop-up window that displays a list of the tags which may be embedded in the files, and allows a user to individually select one or more tags so displayed for searching.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
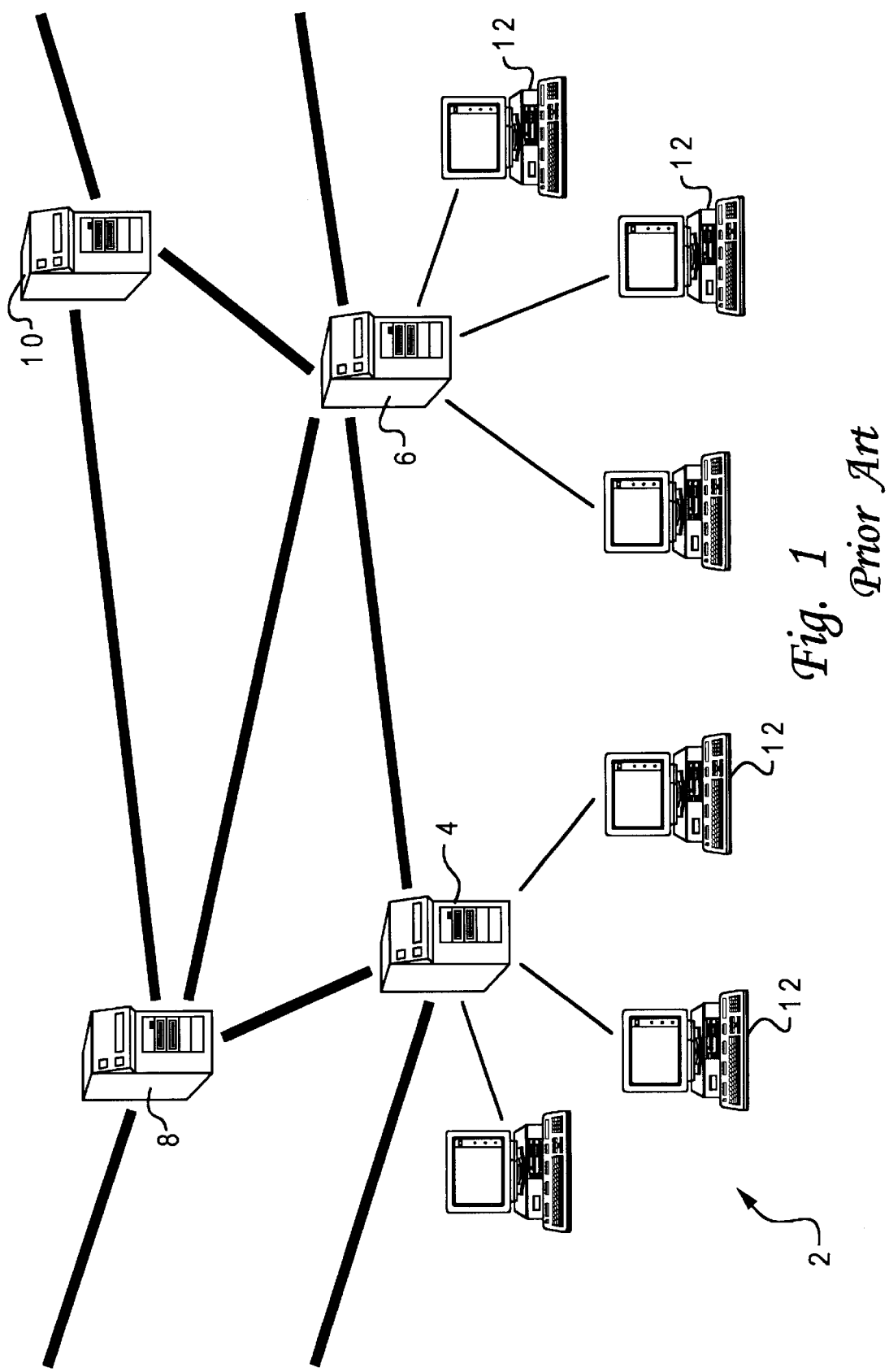
FIG. 1 is a diagram of a conventional computer network, including interconnected servers and client workstations.
Figure 2:
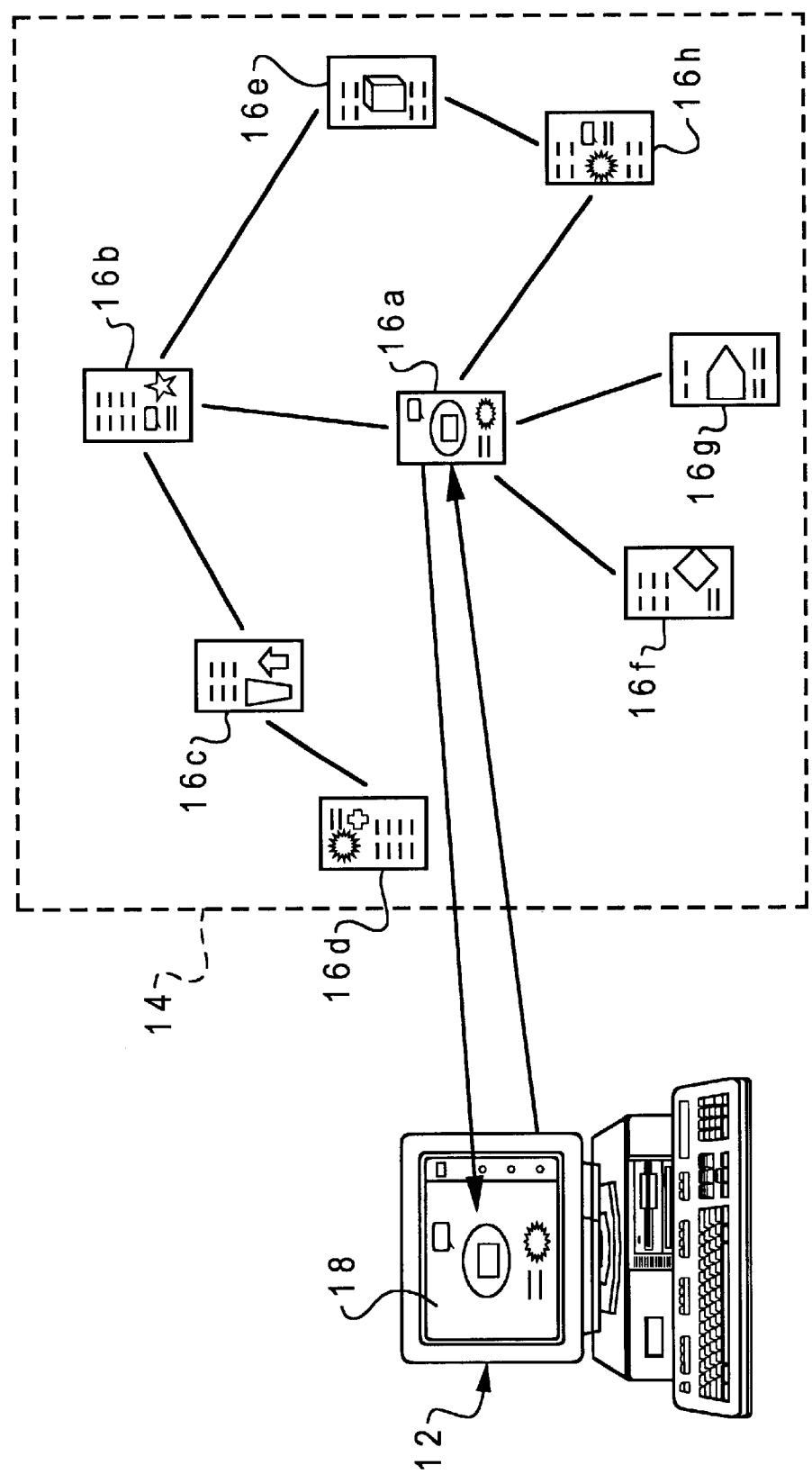
FIG. 2 is a pictorial representation of the retrieval of an object from a set of linked objects residing on the network, such as a page on the World Wide Web.

The present invention is directed to a method of searching for files located in a computer system, particularly files that are distributed across a computer network such as the network of FIG. 1. The invention may, however, be implemented in other networks besides the Internet so, while the present invention may be understood with reference to FIG. 1, this reference should not be construed in a limiting sense.

Figure 3:
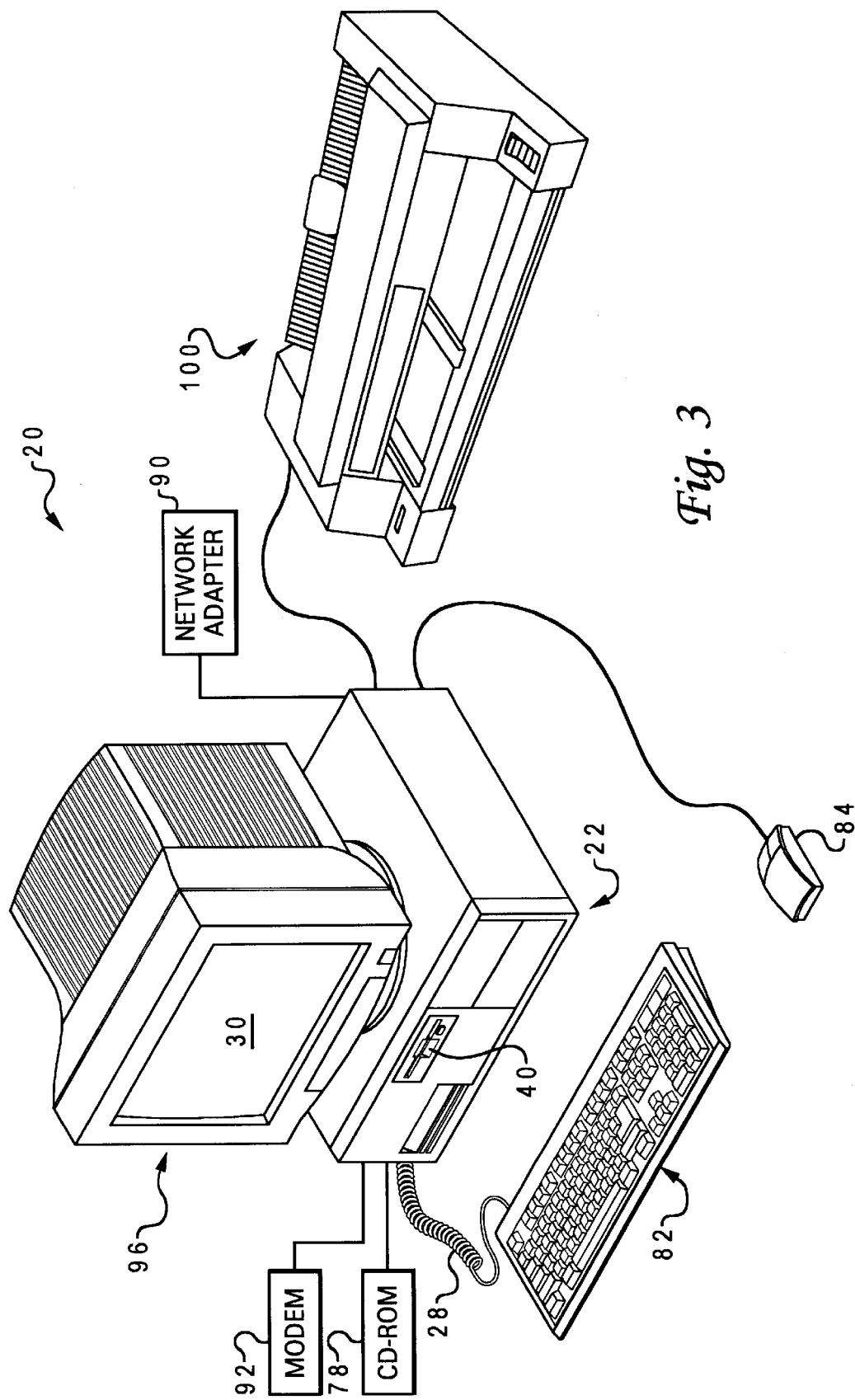
FIG. 3 is an illustration of one embodiment of a data processing system in which the present invention can be practiced.

With further reference to FIG. 3, a data processing system 20 is shown in which the present invention can be practiced. The data processing system 20 includes processor 22, keyboard 82, and display 96. Keyboard 82 is coupled to processor 22 by a cable 28. Display 96 includes display screen 30, which may be implemented using a cathode ray tube (CRT), a liquid crystal display (LCD), an electrode luminescent panel or the like. The data processing system also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such a modem 92, CD-ROM 78, network adapter 90, and floppy disk drive 40, each of which may be internal or external to the enclosure or processor 22. An output device such as a printer 100 may also be coupled with processor 22.

It should be noted and recognized by those persons of ordinary skill in the art that display 96, keyboard 82, and D pointing device 84 may each be implemented using any one of several known off-the-shelf components.

Figure 4:
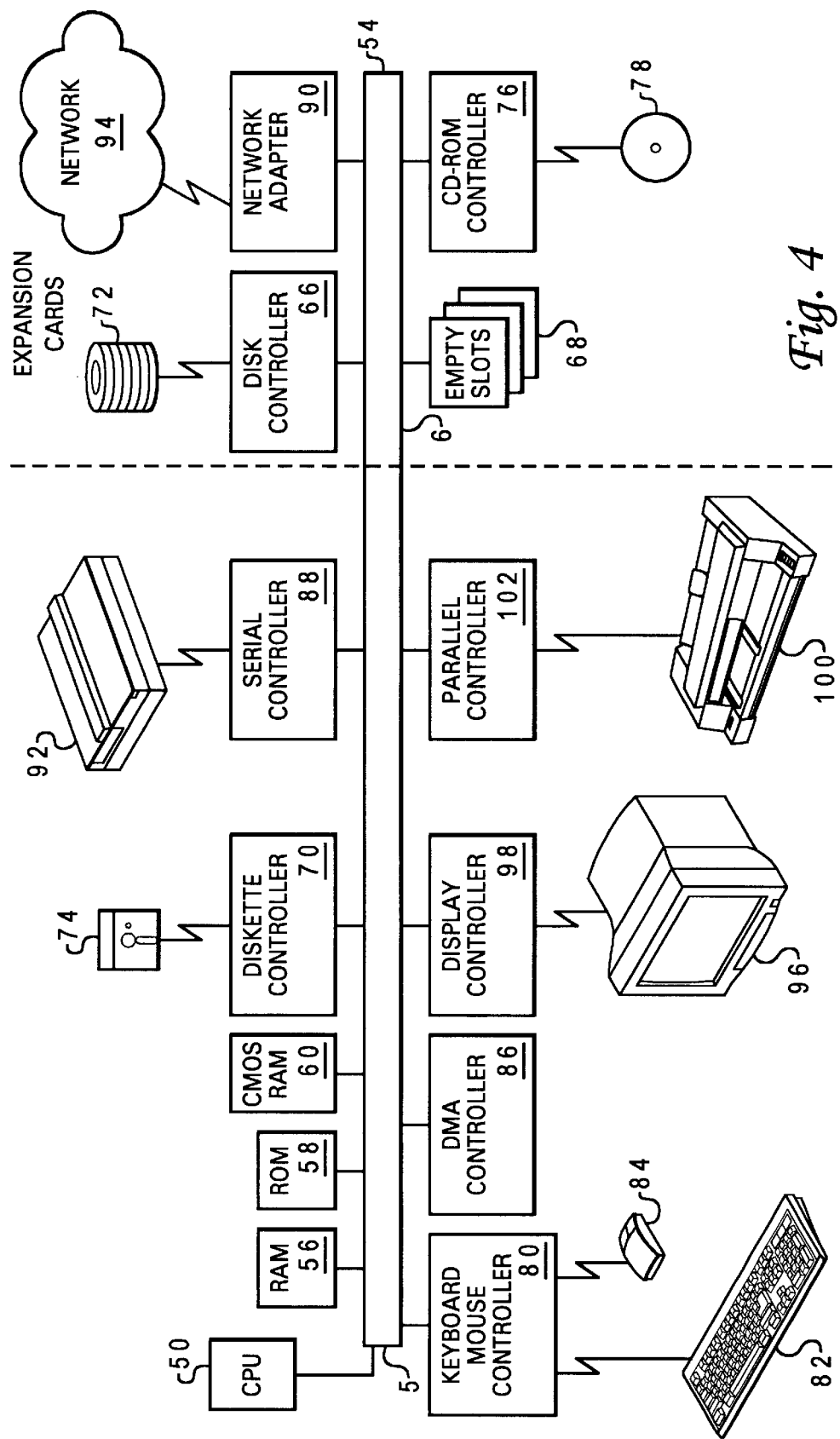
FIG. 4 is a high-level block diagram illustrating selected components that can be included in the data processing system of FIG. 3 according to the teachings of the present invention.

Reference now being made to FIG. 4, a high level block diagram is shown illustrating selected components that can be included in the data processing system 20 of FIG. 3 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to system bus 5 include Random Access Memory (RAM) 56, Read Only Memory (ROM) 58, and nonvolatile memory 60. Such memories include circuitry that allows information to be stored and retrieved. ROMs contain stored data that cannot be modified. Data stored in RAM can be changed by CPU 50 or other hardware devices. Nonvolatile memory is memory that does not lose data when power is removed from it. Nonvolatile memories include ROM, EPROM, flash memory, or battery-pack CMOS RAM. As shown in FIG. 4, such battery-pack CMOS RAM may be used to store configuration information.

An expansion card or board is a circuit board that includes chips and other electronic components connected that adds functions or resources to the computer. Typically, expansion cards add memory, disk-drive controllers 66, video support, parallel and serial ports, and internal modems. For lap top, palm top, and other portable computers, expansion cards usually take the form of PC cards, which are credit card-sized devices designed to plug into a slot in the side or back of a computer. An example of such a slot is PCMCIA slot (Personal Computer Memory Card International Association) which defines type I, II and III card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle tasks such as positioning read/write head, mediating between the drive and the CPU 50, and controlling the transfer of information to and from memory. A single disk controller may be able to control more than one disk drive.

CD-ROM controller 76 may be included in data processing 20 for reading data from CD-ROM 78 (compact disk read only memory). Such CD-ROMs use laser optics rather than magnetic means for reading data.

Keyboard mouse controller 80 is provided in data processing system 20 for interfacing with keyboard 82 and pointing device 84. Such pointing devices are typically used to control an on-screen element, such as a graphical pointer or cursor, which may take the form of an arrow having a hot spot that specifies the location of the pointer when the user presses a mouse button. Other pointing devices include a graphics tablet, stylus, light pin, joystick, puck, track ball, track pad, and the pointing device sold under the trademark "Track Point" by International Business Machines Corp. (IBM).

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 92. A modem is a communication device that enables a computer to transmit information over standard telephone lines. Modems convert digital computer signals to interlock signals suitable for communications over telephone lines. Modem 92 can be utilized to connect data processing system 20 to an on-line information service or an Internet service provider. Such service providers may offer software that can be down loaded into data processing system 20 via modem 92. Modem 92 may provide a connection to other sources of software, such as a server, an electronic bulletin board (BBS), or the Internet (including the World Wide Web).

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task. Network 94 can also provide a connection to other systems like those mentioned above (a BBS, the Internet, etc.).

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image (or combinations thereof) on paper or on another medium, such as a transparency sheet. Other types of printers may include an image setter, a plotter, or a film recorder.

Parallel controller 102 is used to send multiple data and control bits simultaneously over wires connected between system bus 5 and another parallel communication device, such as a printer 100.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 4. Those skilled in the art will appreciate that a data processing system constructed in accordance with the present invention may have multiple components selected from the foregoing, including even multiple processors.

Figure 5:
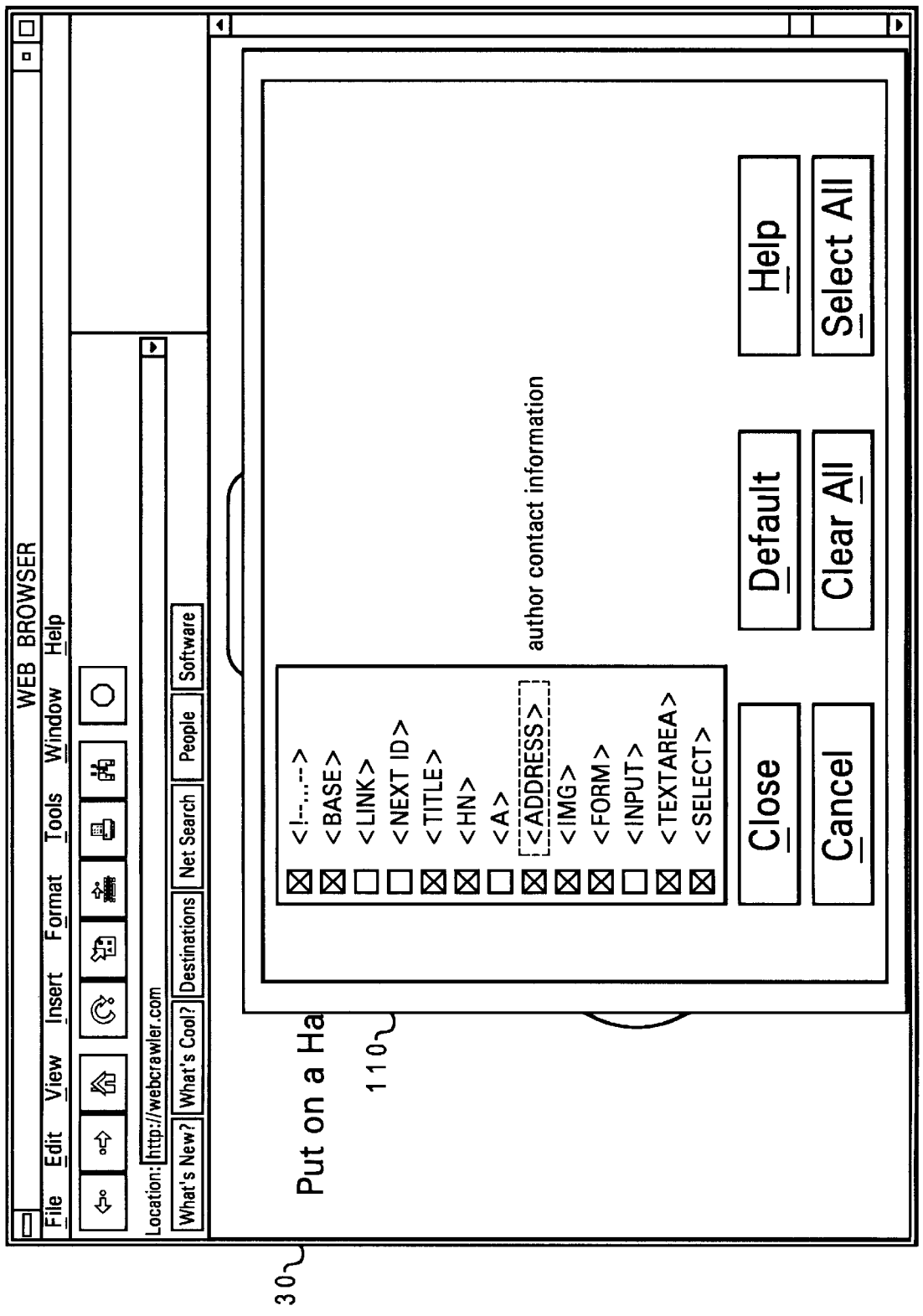
FIG. 5 is an elevational view of a graphical user interface employed by a search program constructed in accordance with the present invention.

Referring now to FIG. 5, one embodiment of the present invention allows data processing system 20 to more efficiently search for files located on system 20, or located on networks which are connected to system 20 (such as local area network 94, or the Internet which may be connected via modem 92). In particular, a preferred embodiment of the present invention is adapted to specifically search for HTML files having tagged fields. The search is limited by processing the HTML file being searched. When performing a search, the end user may either include or exclude the text within a tag for consideration. In the depicted implementation, the user is presented with a pop-up window (or dialog box) 110 on display screen 30 that contains a list of each of the tags, along with a check box for each tag that may be selected (checked) to indicated that the item is to be included when performing a search. The selection of a subset of the tags can thus be made independent of any particular search query.

The default values for some tags in this implementation are given below:

| Default | Syntax | Description |
| --- | --- | --- |
| INCLUDE | <!-- ... --> | comment lines |
| INCLUDE | <BASE> | indicates complete document URL (establishes location context for other URL references) |
| EXCLUDE | <LINK> | sets relationship between current document and other documents |
| EXCLUDE | <NEXT ID> | indicates the next document when multiple HTML documents are chained |
| INCLUDE | <TITLE> | supplies title to HTML |
| INCLUDE | <HN> | supplies N-level headers |
| EXCLUDE | <A> | provides a link to another document |
| INCLUDE | <ADDRESS> | author contact information |
| INCLUDE | <IMG> | inserts a referenced image |
| INCLUDE | <FORM> | marks beginning & end of a form block |
| EXCLUDE | <INPUT> | defines type & appearance for input widgets |
| INCLUDE | <TEXTAREA> | multiline text entry widget |
| INCLUDE | <SELECT> | menu or scrolling list of input items |

A class of HTML commands are defined that may be ignored, i.e., any matches found within these statements should generally not be included as a 'found' item. The following is an exemplary list of such commands in this implementation:

| Syntax | Description |
| --- | --- |
| <BLOCKQUOTE> | used to set off long quotes |
| <DIR> | unbulleted list of short elements |
| <LI> | marks a member item within a list |
| <UL> | bulleted list of elements |
| <MENU> | pickable list of elements |
| <DL> | special format for terms and their definitions |
| <DT> | term being defined in a glossary list |
| <DD> | definition for a term being in a glossary list |
| <B> | boldface text control |
| <CITE> | distinctive text for citations |
| <CODE> | text formatting for code samples |
| <DFN> | text for a term about to be defined |
| <EM> | emphasis for enclosed text |
| <I> | produces italicized text |
| <KBD> | text formatting for text to be entered at keyboard |
| <SAMP> | text formatting for sample in-line text |
| <STRONG> | maximum emphasis for enclosed text |
| <TT> | type-writer font |
| <VAR> | variable substitution |

These tag lists are intended to be illustrative, and should not be construed in a limiting sense. Other tags may arise, e.g., as a result of future HTML development carried out by the World Wide Web Consortium (W3C). Also, "fields" other than those described with HTML tags may be searched, such as applets constructed using java scripts. In this manner, the present invention avoids the problem in the prior art of unwanted search results, and allows the user to retrieve only HTML pages that contain the specified text within a given portion of the HTML.

In addition to the foregoing implementation, the present invention can also be applied to searches using databases such as a WAIS database. In this application, data is analyzed before placement in the WAIS database, i.e., by organizing the information according to its associated HTML command.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the foregoing description relates to the implementation of the invention on a large network like the Internet, the invention is equally applicable to smaller systems such as a local area network (LAN). It is therefore contemplated that such modifications can be made without departing from the spirit or scope of the present invention as defined in the appended claims.

What is claimed is:

1. A method of searching for files located in a computer system, comprising the steps of:
    constructing a plurality of files on the computer system wherein each file has at least one of a plurality of fields, each of said plurality of fields defined by tags embedded in the files;
    creating a search query;
    selecting a subset of the fields for searching by displaying a list of tags which may be embedded in the files and individually selecting one or more tags so displayed for searching, the subset being selected independent of the search query; and
    processing the files by examining the content of only those fields included in the subset for matching against the query.

2. The method of claim 1 wherein said selecting step includes the step of preparing a default subset of the fields.

3. The method of claim 1 wherein said selecting step includes the step of defining a class of fields which cannot be included in the subset.

4. The method of claim 1 wherein the files are distributed across a network of the computer system, and said processing step includes the step of downloading the files to a node of the computer system.

5. The method of claim 4 wherein said constructing step includes the step of embedding a plurality of markup language tags in the files to define the fields.

6. A computer system comprising:
    means for storing a plurality of files wherein each file has at least one of a plurality of fields, each of said plurality of fields defined by tags embedded in the files;
    user interface means for creating a search query by displaying a list of the tags which may be embedded in the files and allowing a user to individually select one or more tags so displayed for searching, and selecting a subset of the fields for searching, the subset being selected independent of the search query; and
    means for processing the files by examining the content of only those fields included in the subset for matching against the query.

7. The computer system of claim 6 wherein said user interface means allows a user to select a default subset of the fields.

8. The computer system of claim 6 wherein said user interface means defines a class of fields which cannot be included in the subset.

9. The computer system of claim 6 wherein said storing means includes a network connected to said processing means.

10. The computer system of claim 9 wherein fields are defined by a plurality of markup language tags embedded in the files.

11. A computer program product comprising:

a storage medium adapted to be read by a computer; and program means stored on said storage medium for (i) providing a user interface on the computer allowing a user to create a search query, and to select a subset of fields for searching wherein the fields are defined by a plurality of tags embedded in a plurality of files located in the computer, and the subset is selected independent of the search query by displaying a list of tags which may be embedded in the files and allowing a user to individually select one or more tags so displayed for searching, and (ii) processing the files by examining the content of only those fields included in the subset for matching against the query.

12. The computer program product of claim 11 wherein said user interface allows a user to select a default subset of the fields.

13. The computer program product of claim 11 wherein said user interface defines a class of fields which cannot be included in the subset.

* * * * *